(12) United States Patent
Willgert et al.

(10) Patent No.: US 9,949,431 B2
(45) Date of Patent: Apr. 24, 2018

(54) YARD MAINTENANCE VEHICLE OBSTACLE AVOIDANCE/NOTIFICATION SYSTEM

(75) Inventors: Mikael Willgert, Spånga (SE); Sean Dwyer, Gastonia, NC (US); Bernard Drew, Savannah, GA (US)

(73) Assignee: HUSQVARNA AB, Huskvarna (SE)

( * ) Notice: Subject to any disclaimer, the term of this patent is extended or adjusted under 35 U.S.C. 154(b) by 130 days.

(21) Appl. No.: 14/368,052

(22) PCT Filed: Dec. 28, 2011

(86) PCT No.: PCT/US2011/067498
§ 371 (c)(1),
(2), (4) Date: Jun. 23, 2014

(87) PCT Pub. No.: WO2013/100941
PCT Pub. Date: Jul. 4, 2013

(65) Prior Publication Data
US 2015/0025755 A1    Jan. 22, 2015

(51) Int. Cl.
*A01D 34/00*    (2006.01)
*A01B 69/00*    (2006.01)
*A01D 75/18*    (2006.01)

(52) U.S. Cl.
CPC .......... *A01D 34/008* (2013.01); *A01B 69/007* (2013.01); *A01D 75/185* (2013.01);
(Continued)

(58) Field of Classification Search
CPC .. G05D 1/0255; G05D 1/0272; G05D 1/0242; G05D 2201/0208; G05D 1/0274; G05D 2201/0215; G05D 1/0219; G05D 1/0246; G01S 19/43; G01S 19/49; G01S 1/02; G01S 5/02; G01S 5/0205; G01S 5/12; G01S 5/16; G01S 13/06; G01S 17/10; G01S 17/46
See application file for complete search history.

(56) References Cited

U.S. PATENT DOCUMENTS 4,694,639 A    9/1987  Chen et al.
4,919,224 A    4/1990  Shyu et al.
(Continued)

FOREIGN PATENT DOCUMENTS

DE    4446867 A1    6/1995
WO    0058801 A1    10/2000
WO    2008080193 A1    7/2008

OTHER PUBLICATIONS

International Preliminary Report on Patentability of PCT/US2011/067498 dated Jul. 1, 2014, all enclosed pages cited.
(Continued)

*Primary Examiner* — Truc M Do
(74) *Attorney, Agent, or Firm* — McNair Law Firm, P.A.

(57) ABSTRACT

A riding yard maintenance vehicle may include a positioning module. The positioning module may include processing circuitry configured to receive information indicative of vehicle position of the riding yard maintenance vehicle, receive an indication of a triggering event that indicates a presence of an obstacle proximate to the riding yard maintenance vehicle, and cause recordation of an obstacle identifier in association with the vehicle position responsive to receipt of the indication.

19 Claims, 8 Drawing Sheets

(52) U.S. Cl.
CPC ..... *B60W 2550/10* (2013.01); *B60W 2550/40* (2013.01); *B60W 2550/402* (2013.01); *B60Y 2200/223* (2013.01)

(56) References Cited

U.S. PATENT DOCUMENTS

| | | | |
|---|---|---|---|
| 5,528,888 A | 6/1996 | Miyamoto et al. | |
| 5,992,381 A * | 11/1999 | Aubourg | F02D 31/005 123/344 |
| 6,236,924 B1 | 5/2001 | Motz et al. | |
| 6,338,013 B1 * | 1/2002 | Ruffner | A01B 69/008 180/167 |
| 6,615,108 B1 * | 9/2003 | Peless | G05D 1/0219 180/167 |
| 6,643,576 B1 | 11/2003 | O Connor et al. | |
| 7,110,881 B2 * | 9/2006 | Gray | G01C 21/00 340/995.19 |
| 2006/0175541 A1 | 8/2006 | Eglington et al. | |
| 2006/0271261 A1 * | 11/2006 | Flores | B60Q 9/008 701/49 |
| 2006/0277884 A1 | 12/2006 | Bucher | |
| 2007/0268155 A1 * | 11/2007 | Holmes | G01S 5/0289 340/901 |
| 2007/0291130 A1 * | 12/2007 | Broggi | G01S 17/023 348/218.1 |
| 2008/0018269 A1 * | 1/2008 | Wyatt | B62D 3/02 318/53 |
| 2008/0220718 A1 * | 9/2008 | Sakamoto | H04B 1/385 455/41.2 |
| 2008/0277188 A1 * | 11/2008 | Hauser | B62D 3/02 180/422 |
| 2009/0235627 A1 * | 9/2009 | Silbernagel | A01D 34/006 56/10.2 G |
| 2010/0063626 A1 * | 3/2010 | Anderson | G05D 1/0088 700/253 |
| 2010/0063648 A1 * | 3/2010 | Anderson | G06N 5/043 701/1 |
| 2010/0114416 A1 * | 5/2010 | Au | G01C 21/165 701/23 |
| 2011/0150348 A1 * | 6/2011 | Anderson | G05D 1/0088 382/224 |
| 2011/0153136 A1 * | 6/2011 | Anderson | G05D 1/0219 701/25 |
| 2011/0166705 A1 * | 7/2011 | Anderson | A01D 34/008 700/253 |
| 2012/0098653 A1 * | 4/2012 | Slack | G08G 1/163 340/435 |
| 2013/0060458 A1 * | 3/2013 | Makela | E21C 35/08 701/301 |
| 2013/0282211 A1 * | 10/2013 | Ruth | B60L 1/003 701/22 |
| 2013/0332049 A1 * | 12/2013 | Larsson | F02D 31/007 701/103 |

OTHER PUBLICATIONS

International Search Report and Written Opinion of PCT/US2011/067498 dated Apr. 25, 2012, all enclosed pages cited.

* cited by examiner

YARD MAINTENANCE VEHICLE OBSTACLE AVOIDANCE/NOTIFICATION SYSTEM

TECHNICAL FIELD

Example embodiments generally relate to yard maintenance vehicles and, more particularly, relate to a riding yard maintenance vehicle having equipment configurable to facilitate the collection of information indicative of the presence of an obstacle while the yard maintenance vehicle performs a task. The obstacle may then, in some cases, be avoided in the future by presenting the operator with a notification of the presence of the obstacle.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Riding yard maintenance vehicles, of which riding lawn mowers serve as an example, are typically capable of transiting over even and uneven terrain to execute yard maintenance activities of various types (e.g., lawn mowing, tilling, brush cutting, mulching, etc.). Regardless of the specific operating environment, riding yard maintenance vehicles are often engaged in activities that their riders may wish to track or monitor either for cost considerations or purely for the sake of interest. For example, vehicle owners may simply want to know how long it takes them to complete a certain task, or how much fuel is consumed in connection with the performance of certain regular maintenance activities. Such monitoring may be very tedious and difficult to accomplish when handled manually. As computing devices become more ubiquitous, such devices may be incorporated into the operations of riding yard maintenance vehicles to increase the ability of users to monitor various aspects of vehicle activity.

BRIEF SUMMARY OF SOME EXAMPLES

Some example embodiments may therefore provide a riding yard maintenance vehicle having an onboard monitoring module that may be configured to, manually or automatically, record a position of an obstacle. Proximity to the obstacle may thereafter trigger a notification to the operator so that the operator can avoid the obstacle. In some embodiments, for example, a global positioning system (GPS) receiver and/or an accelerometer may be employed to track information regarding vehicle positioning (e.g., latitude, longitude, grid location relative to certain points of interest, and/or the like), which may be obtained and recorded in connection with obstacle information. Processing circuitry including a storage device for storing the information and a processor for processing the information may in some cases be employed to enable notifications to be provided during future instances where operation of the vehicle results in the vehicle being proximate to a known obstacle location.

In one example embodiment, a riding yard maintenance vehicle is provided. The riding yard maintenance vehicle may include ground contacting wheels, an engine operably coupled to the ground contacting wheels, a steering assembly operably coupled to the ground contacting wheels to direct movement of the riding yard maintenance vehicle based on operator steering inputs, and a positioning module. The positioning module may be configured to enable storage of vehicle position information. The positioning module may include processing circuitry configured to receive information indicative of vehicle position of a riding yard maintenance vehicle, receive an indication of a triggering event that indicates a presence of an obstacle proximate to the riding yard maintenance vehicle, and cause recordation of an obstacle identifier in association with the vehicle position responsive to receipt of the indication.

In another example embodiment, a method is provided. The method may include receiving information indicative of vehicle position of a riding yard maintenance vehicle, receiving an indication of a triggering event that indicates a presence of an obstacle proximate to the riding yard maintenance vehicle, and causing, via processing circuitry, recordation of an obstacle identifier in association with the vehicle position responsive to receipt of the indication.

In another example embodiment, a method is provided. The method may include receiving information indicative of vehicle position of a riding yard maintenance vehicle, comparing, via processing circuitry, the vehicle position to a recorded location associated with an obstacle identifier, and generating an alert to an operator of the riding yard maintenance vehicle responsive to the vehicle position being within a predefined distance of the recorded location.

In one example embodiment, a riding yard maintenance vehicle is provided. The riding yard maintenance vehicle may include ground contacting wheels, an engine operably coupled to the ground contacting wheels, a steering assembly operably coupled to the ground contacting wheels to direct movement of the riding yard maintenance vehicle based on operator steering inputs, and a positioning module. The positioning module may include processing circuitry configured to receive information indicative of vehicle position of a riding yard maintenance vehicle, compare the vehicle position to a recorded location associated with an obstacle identifier, and generate an alert to an operator of the riding yard maintenance vehicle responsive to the vehicle position being within a predefined distance of the recorded location.

Some example embodiments may improve the ability of operators to monitor and/or record information to facilitate obstacle avoidance during the operation of a riding yard maintenance vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
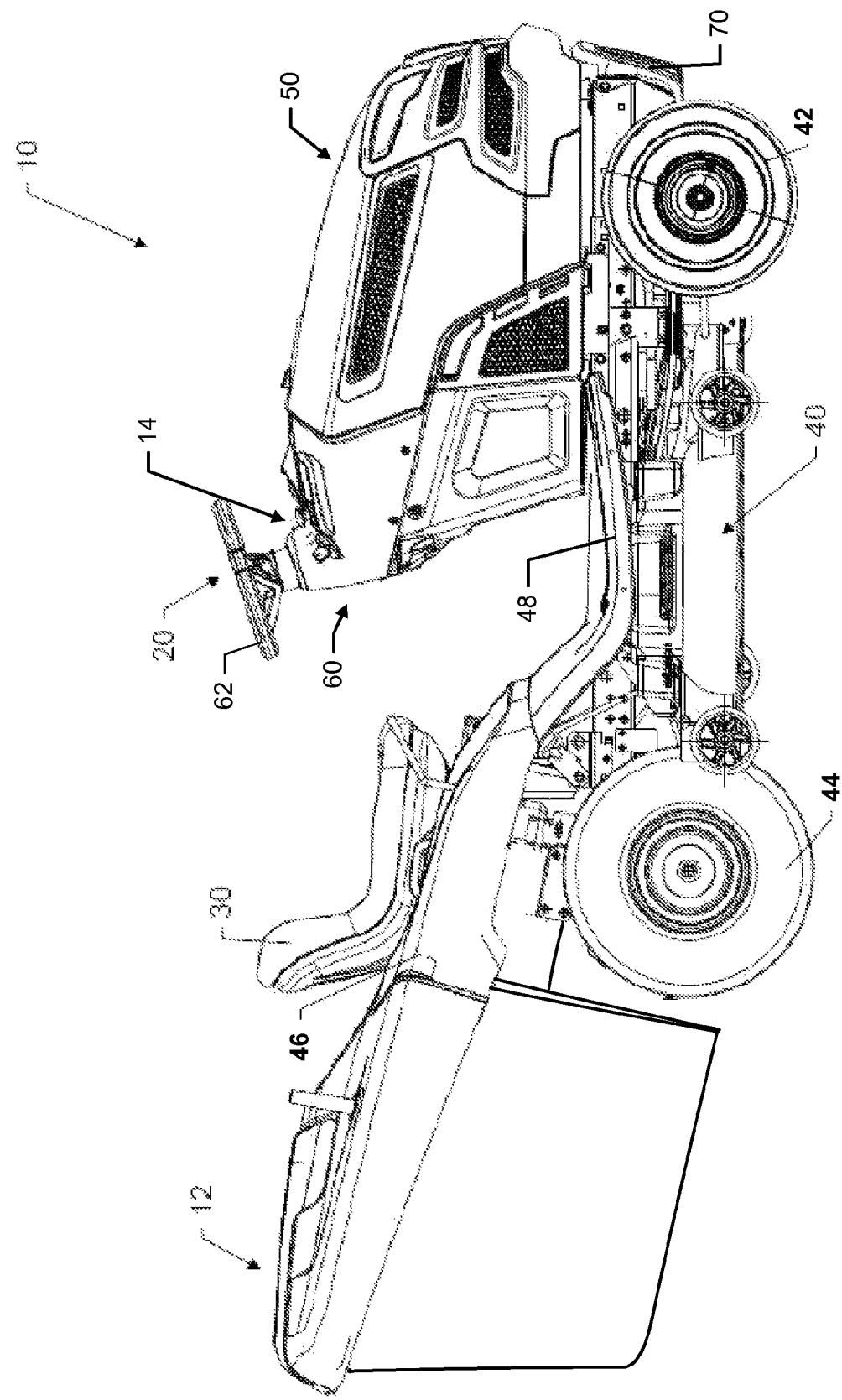
FIG. 1A illustrates a side view of a riding yard maintenance vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a riding yard maintenance vehicle is provided with an onboard positioning module configured to enable data related to position of the vehicle to be tracked and/or recorded. The position information may then be stored and/or processed (e.g., by onboard or remote processing and storage equipment) in connection with information indicative of the position of one or more obstacles in order to provide the operator of the riding yard maintenance vehicle with feedback relating to proximity to the one or more obstacles during operation of the vehicle. In some cases, the riding yard maintenance vehicle may be equipped to display, record and/or report information related to proximity to an obstacle so that the operator may avoid the obstacle. The position of obstacles may be recorded automatically and/or manually by the operator.

Figure 1B:
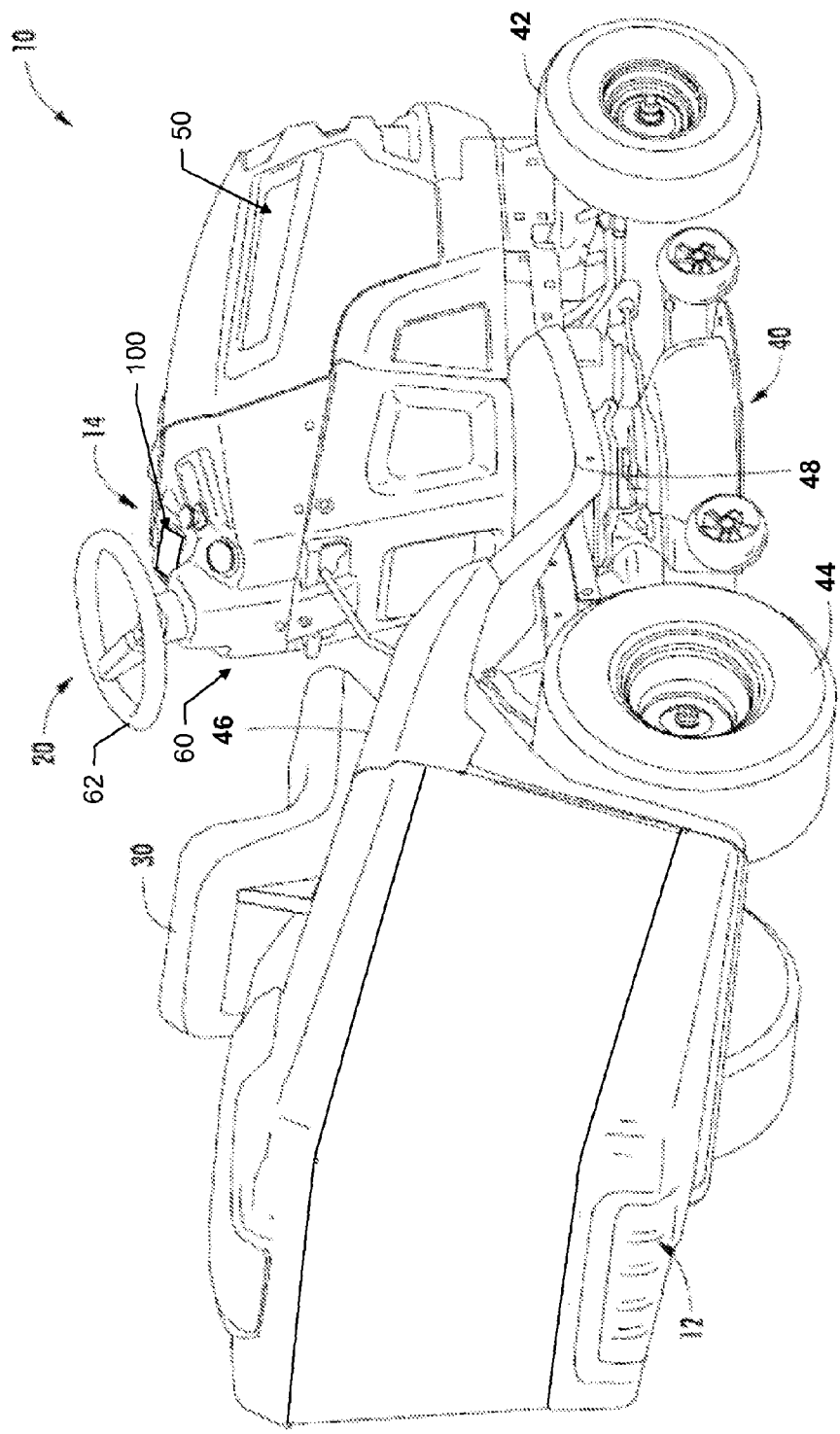
FIG. 1B illustrates a perspective view of the riding yard maintenance vehicle according to an example embodiment.

FIG. 1, which includes FIGS. 1A and 1B, illustrates an example of a riding yard maintenance vehicle 10 having a bagging attachment 12. However, it should be appreciated that example embodiments may be employed on numerous other riding yard maintenance vehicles that may not include a bagging attachment 12. The riding yard maintenance vehicle 10 may also include an information panel 14 displaying operational information regarding the riding yard maintenance vehicle 10. As shown and described herein, the riding yard maintenance vehicle 10 may be a riding lawn mower (e.g., a lawn tractor, front-mount riding lawn mower, zero-turn riding lawn mower, and/or the like). However, other example embodiments may be employed on riding yard maintenance vehicles that are configured or otherwise equipped to handle snow removal, brush cutting, tilling or other yard maintenance-related activities.

FIG. 1A illustrates a side view of the riding yard maintenance vehicle 10 and FIG. 1B illustrates a perspective view of the riding yard maintenance vehicle 10. The riding yard maintenance vehicle may include a steering assembly 20 (e.g., including a steering wheel, handle bars, or other steering apparatus) functionally connected to wheels of the riding yard maintenance vehicle 10 to which steering inputs are provided (e.g., the front and/or rear wheels in various different embodiments) to allow the operator to steer the riding yard maintenance vehicle 10. In some embodiments, the riding yard maintenance vehicle 10 may include seat 30 that may be disposed at a center, rear or front portion of the riding yard maintenance vehicle 10. The operator may sit on the seat 30, which may be disposed to the rear of the steering assembly 20 to provide input for steering of the riding yard maintenance vehicle 10 via the steering assembly 20.

The riding yard maintenance vehicle 10 may also include, or be configured to support attachment of, a cutting deck 40 having at least one cutting blade mounted therein. In some cases, a height of the at least one cutting blade may be adjustable by an operator of the riding yard maintenance vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding yard maintenance vehicle 10 may also include additional control related components such as one or more speed controllers, cutting height adjusters and/or the like. Some of the controllers, such as the speed controllers, may be provided in the form of foot pedals that may sit proximate to a footrest 48 (which may include a portion on both sides of the riding yard maintenance vehicle 10) to enable the operator to rest his or her feet thereon while seated in the seat 20.

In the pictured example embodiment of FIG. 1, an engine 50 of the riding yard maintenance vehicle 10 is disposed substantially forward of a seated operator. However, in other example embodiments, the engine 50 could be in different positions such as below or behind the operator. In some embodiments, the engine 50 may be operably coupled to one or more of the wheels of the riding yard maintenance vehicle 10 in order to provide drive power for the riding yard maintenance vehicle 10. In some embodiments, the engine 50 may be capable of powering two wheels, while in others, the engine 50 may power any of one to all four wheels of the riding yard maintenance vehicle 10. Moreover, in some cases, the engine 50 may manually or automatically shift between powering either two wheels or all four wheels of the riding yard maintenance vehicle 10. The engine 50 may be housed within a cover that forms an engine compartment to protect engine 50 components and improve the aesthetic appeal of the riding yard maintenance vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding yard maintenance vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the steering assembly housing 60, the steering wheel 62 and/or the fender 46 may include gauges, displays and/or other user interface components. As such, for example, user interface components may be provided to indicate or display information to the operator regarding operational parameters related to the operation of the riding yard maintenance vehicle 10. The information may relate to any of various aspects including parameters related to cutting deck operation, engine operation, run time, work time, operator in-seat time, etc.

In an example embodiment, the riding yard maintenance vehicle 10 may include a proximity sensor 70. However, other example embodiments may not include a proximity sensor 70. In embodiments where the proximity sensor 70 is employed, the proximity sensor may be disposed at a forward portion of the riding yard maintenance vehicle 10 to emit signals that may be returned or reflected off of an obstacle to be received by the proximity sensor 70 to indicate the presence of an obstacle. The proximity sensor 70 may therefore transmit a relatively short range signal that attenuates quickly so as not to interfere with other electronic devices, but is still detectable when reflections are received from an object nearby. In some embodiments, a strength of the return signal or frequency thereof may be indicative of the size of the obstacle and/or the relative distance away from the obstacle. Although the proximity sensor 70 may be disposed at a forward portion of the riding yard maintenance vehicle 10 to detect objects in front of the riding yard maintenance vehicle 10, some embodiments may further include proximity sensors disposed on sides and/or the rear of the riding yard maintenance vehicle 10.

In an example embodiment, one or more these gauges, displays and/or other user interface components may be disposed on the information panel 14. However, in other examples, one or more of the gauges, displays or user interface components may be either fixed in their positions on the riding yard maintenance vehicle 10 or may be rotatably mounted to the riding yard maintenance vehicle 10. In an example embodiment, the information panel 14 (or some other user interface component) may include at least a display screen 100 along with corresponding processing circuitry.

The display screen 100 may provide any of number of different gauges, displays or user interface consoles or elements on a single screen or on multiple screens that may be accessible by operator interaction. In some embodiments, the display screen 100 may be a liquid crystal display (LCD) or similar display screen. The display screen 100 may be a touch screen in some embodiments, and thus, operator instructions may be provided directly via the display screen 100. However, in other example embodiments, the display screen 100 may be accompanied by one or more function buttons that may be selected by the operator to perform any of various functions such as navigating menus and/or selecting menu items, inputting data, providing instructions, and/or the like.

The display screen 100 and corresponding processing circuitry may be powered by an internal battery, or by power generated at the riding yard maintenance vehicle 10 (e.g., via a battery or alternator thereof). The display screen 100 may, in some cases, display information related to vehicle position, or display information related to applications and/or services executed by the processing circuitry based on the vehicle's position (e.g., routing services, optimization services, maintenance related services and/or the like). In an example embodiment, the display screen 100 may be in communication with a positioning module configured to provide or facilitate the provision of the applications and/or services based on the collection of position information regarding the vehicle to facilitate identification of obstacles and/or generate notifications regarding proximity to known obstacles. As such, the positioning module may be configured to collect, store and/or process the information as described in greater detail below and then, in at least some embodiments, provide feedback or other output information to the display screen 100 and/or other user interface components of the riding yard maintenance vehicle 10. Thus, for example, route or parcel information may be displayed on the display screen 100 along with one or more obstacle identifiers indicating the presence of corresponding obstacles that should be avoided.

Although, some embodiments may enable recording of obstacle locations for presentation on a display, it should be appreciated that other embodiments may not necessarily display obstacle locations or even employ a display. Instead, some embodiments may record obstacle locations and provide a warning (e.g., via a warning light on the information panel 14 or via an audible or tactile alert) to operators when a comparison of current vehicle position to a known or recorded obstacle position indicates that the vehicle is within a predefined distance of the obstacle position. In such an example, no geographic representation of the route, parcel or obstacle location may need to be employed.

Figure 2:
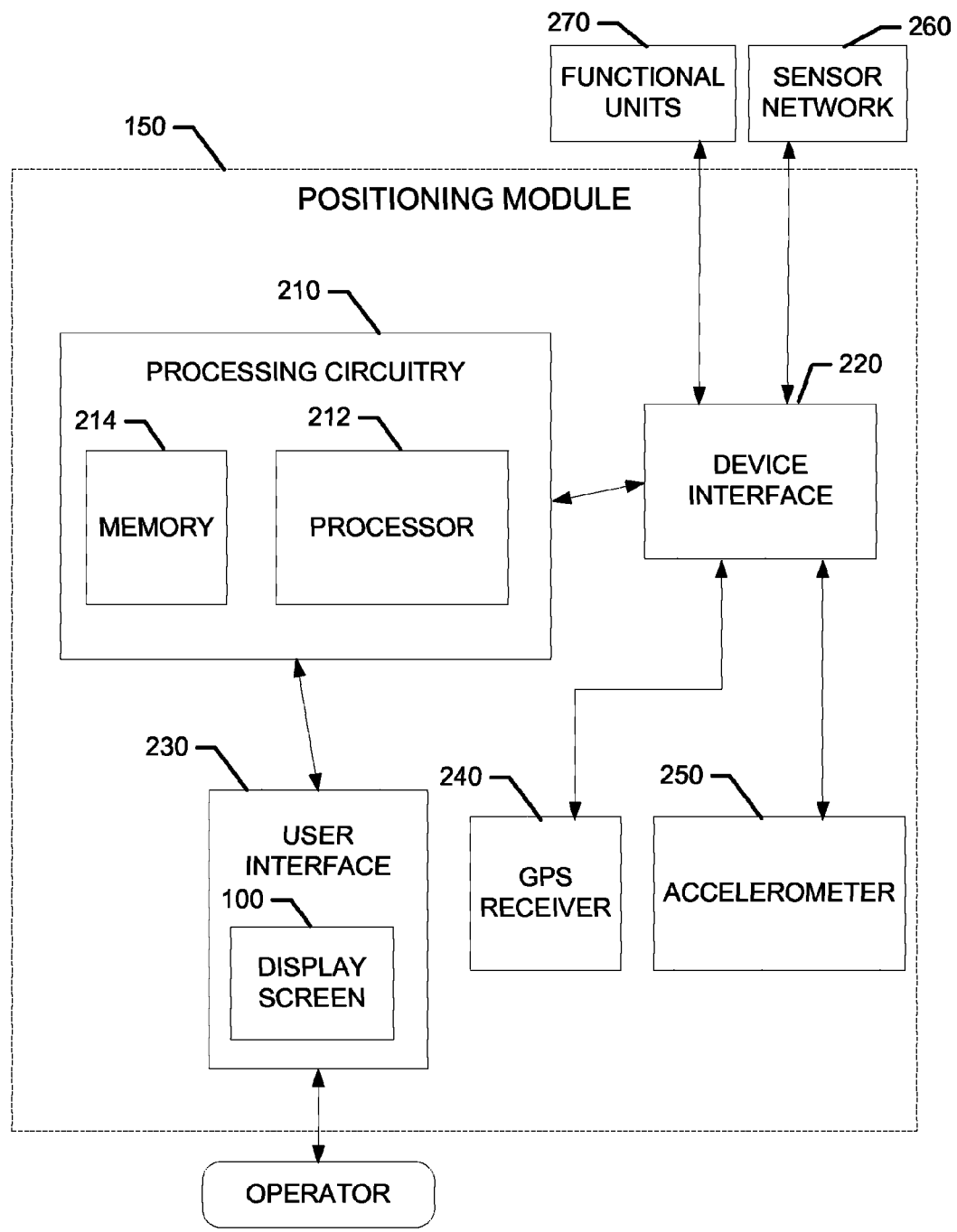
FIG. 2 illustrates a block diagram of components of a positioning module according to an example embodiment.

FIG. 2 illustrates a block diagram of various components of a positioning module 150 to illustrate some of the components that enable the functional performance of the positioning module 150 and to facilitate description of an example embodiment. In some example embodiments, the positioning module 150 may be disposed at the riding yard maintenance vehicle 10 (e.g., within the steering assembly housing 60). However, in other embodiments, the positioning module 150 (or at least portions thereof capable of analyzing and processing data using the processing circuitry 210 as described herein) may be disposed at a remote computer, a cell phone or other mobile device of the operator, or another device that may receive data from the riding yard maintenance vehicle 10 or a remote database as described below. In embodiments where the positioning module 150 is not integrated in the riding yard maintenance vehicle 10, the positioning module 150 may not include any sensors, but may receive sensor data from remote sources, or may receive data indicative of sensor data generated by remote sensors. In an example embodiment, the positioning module 150 may include or otherwise be in communication with processing circuitry 210 that is configurable to perform actions in accordance with example embodiments described herein. As such, for example, the functions attributable to the positioning module 150 may be carried out by the processing circuitry 210.

The processing circuitry 210 may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors of the riding yard maintenance vehicle 10 via a single data bus. As such, the data bus may connect to a plurality or all of the switching components and/or other electrically controlled components of the riding yard maintenance vehicle 10.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display (e.g., the display screen 100), one or more buttons or keys (e.g., function buttons), and/or other input/output mechanisms (e.g., microphone, speakers, cursor, joystick, lights and/or the like). However, as indicated above, in some embodiments, no display may be included. In embodiments where the positioning module 150 is remotely located from the riding yard maintenance vehicle 10, the user interface 230 may include a display other than the display screen 100 of FIG. 1.

The device interface 220 may include one or more interface mechanisms for enabling communication with other devices (e.g., sensors of a sensor network 260 and/or other accessories or functional units 270 such as motors, servos, switches or other operational control devices for automatic responses). In some cases, the device interface 220 may be any means such as a device or circuitry embodied in either hardware, or a combination of hardware and software that is configured to receive and/or transmit data from/to sensors in communication with the processing circuitry 210. In some example embodiments, the device interface 220 may provide interfaces for communication of components internal to the positioning module 150 (as shown in the example of FIG. 2). However, in other embodiments, components of the sensor network 260 (e.g., including GPS receiver 240 and/or accelerometer 250) or functional units 270 may be external to the positioning module 150 and the device interface 220 may still provide interface capabilities for interaction with such components. Automatic responses such as operational control functions that implement automatic shutdown of the power take-off (PTO), stopping blade rotation, and/or the like, may be implemented via the provision of control signals to the functional units 270 via the device interface 220.

In embodiments employing a sensor network, the sensor network 260 may include one or more sensors disposed at any of various locations throughout the riding yard maintenance vehicle 10 to monitor various parameters. For example, a seat sensor may be used to determine whether the operator is seated and engine sensors may determine engine parameters such as RPM, torque, or temperature. In some embodiments, one or more sensors may determine vehicle speed, blade speed, blade height, and/or the like. Sensors may also be used to determine engine run time, machine work time, and other operational parameters including sound emanating from the cutting deck. Thus, for example, the sound may be analyzed and noise from striking an object may be identifiable so that an event encountered during a cutting operation can later be classified as an interaction with an obstacle. Blade height may be determined at the time of the strike using other sensors of the sensor network and the corresponding information may be used for programming preselected cutting deck heights in respective different areas of a route or parcel. In some embodiments, positioning and/or orientation sensors (e.g., global positioning system (GPS) receiver 240 and/or accelerometer 250) may be included to monitor, display and/or record data regarding vehicle position and/or orientation. In this regard, for example, the GPS receiver 240 may be configured to generate data corresponding to latitude, longitude, speed, elevation, time, data and/or the like of the riding yard maintenance vehicle 10, and communicate such data to the processing circuitry 210. Meanwhile, for example, the accelerometer 250 may be configured to generate data corresponding to horizontal, vertical, and rotational accelerations of the riding yard maintenance vehicle 10, and communicate such data to the processing circuitry 210. As such, the accelerometer 250 may be used to determine position relative to one or more known start points or other points of interest. Data from the sensors (including the data from the GPS receiver 240 and/or the accelerometer 250) may be fed to the processing circuitry 210 for storage, display, or for use in connection with applications that may be executed by the processing circuitry 210.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the positioning module 150 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from the sensor network 260. Among the contents of the memory 214, applications may be stored for execution by the processor 212 in order to carry out the functionality associated with each respective application. In some cases, the applications may include obstacle proximity notification applications that utilize positional information (e.g., information descriptive of vehicle location) to facilitate storing information descriptive of obstacle locations responsive to various manual and/or automatic triggers. In some cases the applications may alternatively or additionally utilize positional information (which may also be stored in the memory 214 in some cases) to provide a notification to the operator responsive to the vehicle being proximate to one or more obstacle locations.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the positioning module 150. As such, in some embodiments, the processor 212 (or the processing circuitry 210) may be said to cause each of the operations described in connection with the positioning module 150 by directing the positioning module 150 to undertake the corresponding functionalities responsive to execution of instructions or algorithms configuring the processor 212 (or processing circuitry 210) accordingly. As an example, the positioning module 150 may be configured to record position information, or other operational parameters regarding the tasks performed by riding yard maintenance vehicle 10 as described herein. The positioning module 150 may then, in some cases, process the information to generate alerts, warnings, route optimization, route guidance, maintenance recommendations, position histories, work histories, and/or the like.

In an example embodiment, the processing circuitry 210 may be configured to generate display views and/or screen emulations to display data gathered by the sensor network 260 and/or to display information generated based on the data gathered by the sensor network 260. Alternatively or additionally, the processing circuitry 210 may be configured to generate charts or other displays to illustrate information determinable based on the data. In some embodiments, the processing circuitry 210 may process, direct display of and/or store GPS position data (e.g., as a position history), speed information, orientation information, run time, work time, engine parameters, and/or the like. Thus, for example, the processing circuitry 210 may direct storage of the data or other information generated based on the data in the memory 214. As such, the processing circuitry 210 may organize the data or information for reporting or for use in other applications that may be locally or remotely executed. For example, the processing circuitry 210 may store data for reporting to a computer executing fleet management software to manage a fleet of lawn mowers for implementation of efficient service, maintenance and operation management. In some cases, the positioning module 150 itself may be extracted from the riding yard maintenance vehicle 10 and mated with a remote network terminal or computer. The information stored on the memory 214 may then be extracted and thereby reported for fleet management or other applications. In other cases, the device interface 220 may be configured to wirelessly transmit information associated with the positioning module 150 to a remote computer to enable data processing to be accomplished on the remote computer. For example, in some cases, Bluetooth, WiFi or other wireless communication modules may be provided by the device interface 220 in order to allow wireless downloading of software, support information or other data, or allow wireless uploading of data to network devices for support, analysis, management or other purposes. In some embodiments, Bluetooth, WiFi or other short range wireless communication modules may be used to communicate data to an intermediate device (e.g., a cell phone), which may then communicate the data to a computer or other device at which certain analysis and/or display may be performed. In still other cases, a removable memory device may be used to transfer information from the memory 214 to the removable memory device and thereafter to the remote computer.

In some cases, information may also be uploaded from the remote network terminal or computer to the positioning module 150. For example, upgrading software to improve the functionality of the positioning module 150 may be uploaded. In some embodiments, software upgrading user interface capabilities, adding new sensor interface capability, and/or adding other improved functionality may be added via upload in order to upgrade the positioning module 150. Obstacle location information may also or alternatively be uploaded in some embodiments. For example, obstacle location information which may be organized for a particular parcel, route, organization, individual and/or the like may be uploaded from the remote network terminal or computer to the positioning module 150.

As indicated above, the positioning module 150 may be configured to store position information (e.g., in the memory 214). In some embodiments, the positioning module 150 may be configured to store waypoint data at regular or predefined intervals to define a position history or route. In some cases, one or more of the waypoints stored may include location information (e.g., latitude/longitude or other information indicative of a position relative to one or more known locations) that may or may not be annotated with additional information (e.g., obstacle identification or tagging). In some examples, a GPS sentence (e.g., an NMEA 0183 sentence) may be recorded once each second (or at any other defined interval), either alone or in combination with other data. Thus, in some cases, each waypoint may have other information stored in association therewith. For example, waypoint information may include information indicative of one or more of elevation, orientation (e.g., in an x/y/z coordinate field), engine RPM, run time, work time, speed, cutting blade torque, an obstacle tag, and/or the like.

In some embodiments, the positioning module 150 may be configured to map the waypoint data in order to create route information descriptive of events occurring along the route or for a given parcel. Thus, for example, position and other event data may be stored as an annotated position history in the form of an annotated route. In some embodiments, the routes may be organized by geographic location (e.g., all routes associated with a certain parcel), by time/date (e.g., all routes on a particular date, starting or ending at a particular time, or within a given date/time window), by customer, or by combinations of the aforementioned along with (or without) other criteria. As such, the positioning module 150 may be able to generate route information by recording position versus time of the riding yard maintenance vehicle 10. In this regard, the positioning module 150 may essentially be enabled to trace out the path taken by the riding yard maintenance vehicle 10 during operations with respect to a particular job or series of jobs and the path may be annotated with respect to certain events that are encountered as described herein. The data may be stored as annotated route information and, in some cases, may also be presented on the display screen 100 (or on a remote display). The presentation may be provided at any time during generation of the route, or after completion of the entire route.

In an example embodiment, the sensor network 260 of the riding yard maintenance vehicle 10 may be utilized in connection with providing event data for route annotation responsive to triggering events. Alternatively or additionally, the operator may manually tag certain locations and define an event or obstacle identifier to be associated with the corresponding locations. According to an example embodiment, the event or obstacle identifiers may relate to the identification of obstacles encountered while operating the riding yard maintenance vehicle 10. Events that may be indicative of encountering an obstacle may be considered to be triggering events, which may occur responsive to active or passive activity (or combinations thereof).

Triggering events generated responsive to passive activity may include events that are determinable without operator involvement regardless of whether an active function is executed by equipment associated with the riding yard maintenance vehicle 10. In other words, even if an active signal is transmitted (e.g., by the proximity sensor 70), the activity associated with identifying an obstacle using the proximity sensor 70 may be considered a passive activity since the operator need not take an active role in directing the operation of the proximity sensor 70. Accordingly, in some embodiments, any event that is determinable responsive to monitoring data provided by the sensor network 260 may be a passive activity based triggering event. As an example, if a rock, stump, root or other obstacle is encountered and hit by the mower blade, a change in engine torque, cutting deck sound, or RPM may be experienced by an engine torque sensor, audio recorder or RPM sensor of the sensor network 260. If the change is significant enough (e.g., if the change is greater than a threshold amount), the event may be registered or recorded. The proximity sensor 70, if employed, may also only register or record events that are associated with return or reflected signals above a given threshold. Alternatively, data may be recorded and uploaded or otherwise provided to the processing circuitry 210 for analysis after the fact.

Triggering events generated responsive to active activities (or events) may include operator initiated events. For example, the operator may press a button (e.g., on or near the information panel 14) or select a menu option to mark a location as being associated with an obstacle. Alternatively or additionally, the operator may mark a position on a map view for association with an obstacle. In any case, the triggering of an active event by the operator may annotate the generic existence of an obstacle, or the operator may input descriptive information regarding the obstacle. For example, the operator may input text or select an icon, image or tag that uniquely identifies or describes characteristics of an obstacle (e.g., rock, boulder, post, root, tree, fence, etc.).

Events that involve a combination of active and passive activity may initially be detected passively, but may require active participation from the operator to confirm the existence of the obstacle, to annotate characteristics of the obstacle, to identify the obstacle, and/or the like. As an example, a potential obstacle may be identified passively (e.g., the proximity sensor 70 may be set off, or the RPM sensor may indicate a drop in RPM as an object is stricken with the mower blade), and an indication of the passive detection may be provided to the operator. The operator may then select whether to mark or record the passive detection as an obstacle or whether to clear the indication. Thus, for example, if the drop in RPM that causes a passive triggering event was due to striking an object that has been removed, or if the proximity sensor 70 detected a mobile object that has been moved, no recording of a permanent obstacle that will be encountered at that same location in the future will be made.

Whether an event is triggered based on activity that is active, passive or a combination thereof, in some embodiments, the corresponding location at which the event occurred may be annotated with an obstacle identifier to indicate the existence of an obstacle, or potential obstacle. The data supporting the existence of an obstacle (e.g., data indicating the method of detection) may be provided in association with the corresponding location, or an indication that data supporting the existence of the obstacle was encountered at the corresponding location may be provided (e.g., without the data itself). In embodiments where a display is employed and a route is displayed thereon, an obstacle marker and/or obstacle annotation may be rendered in connection with or to otherwise represent an obstacle identifier on the display at the corresponding location at which a triggering event has occurred. The obstacle marker may be a simple graphic indicative of a generic obstacle, or may be an icon, marker or other indicator that corresponds to the type of obstacle encountered. Data descriptive of or otherwise regarding the obstacle may be displayed with the obstacle marker as an obstacle annotation or, in some cases, may be accessible via selection of the marker or a menu option associated with the marker. As such, the obstacle marker and/or the obstacle annotation may each be considered to be part of or representative of the obstacle identifier generated by the triggering event.

Position information along with obstacle identification information may be stored or otherwise recorded by the positioning module 150. As such, the positioning module 150 may record the existence and location of one or more obstacles associated with a particular route or parcel. In other words, the positioning module 150 may store an obstacle identifier in association with a location to indicate that an obstacle (or potential obstacle) is located at the corresponding location. The stored information may be recorded locally at the vehicle gathering the data or remotely at another device as described in greater detail below. The positioning module 150 may also be enabled to upload stored information from other sources (e.g., if the positioning module 150 is located on a computer, data may be uploaded from the riding yard maintenance vehicle 10 for analysis and obstacle locations may be determined for later provision to the same or other vehicles). Whether accessing locally stored information or uploading information provided from a remote source, the positioning module 150 may be further configured to generate alerts (e.g., warnings, notifications, etc.) or operational control functions when the riding lawn care vehicle 10 enters within a predefined distance of the recorded location of an obstacle. The alerts may be provided audibly, visually, or via vibration or other tactile means. Moreover, in some cases, the operator may be enabled to select desired alert methods or characteristics. Operational control functions may include adjustments to blade heights (or suggestions regarding such adjustments), stopping of blade or power-take-off (PTO) rotation, and/or the like. In an example embodiment, the positioning module 150 may be configured to continuously compare vehicle position to known obstacle locations associated with recorded obstacle identifiers. If vehicle position approaches to within a predetermined distance of one of the recorded obstacle identifiers, the positioning module 150 may further cause the generation of an alert or warning to the operator, or the initiation of an operational control function.

Figure 3:
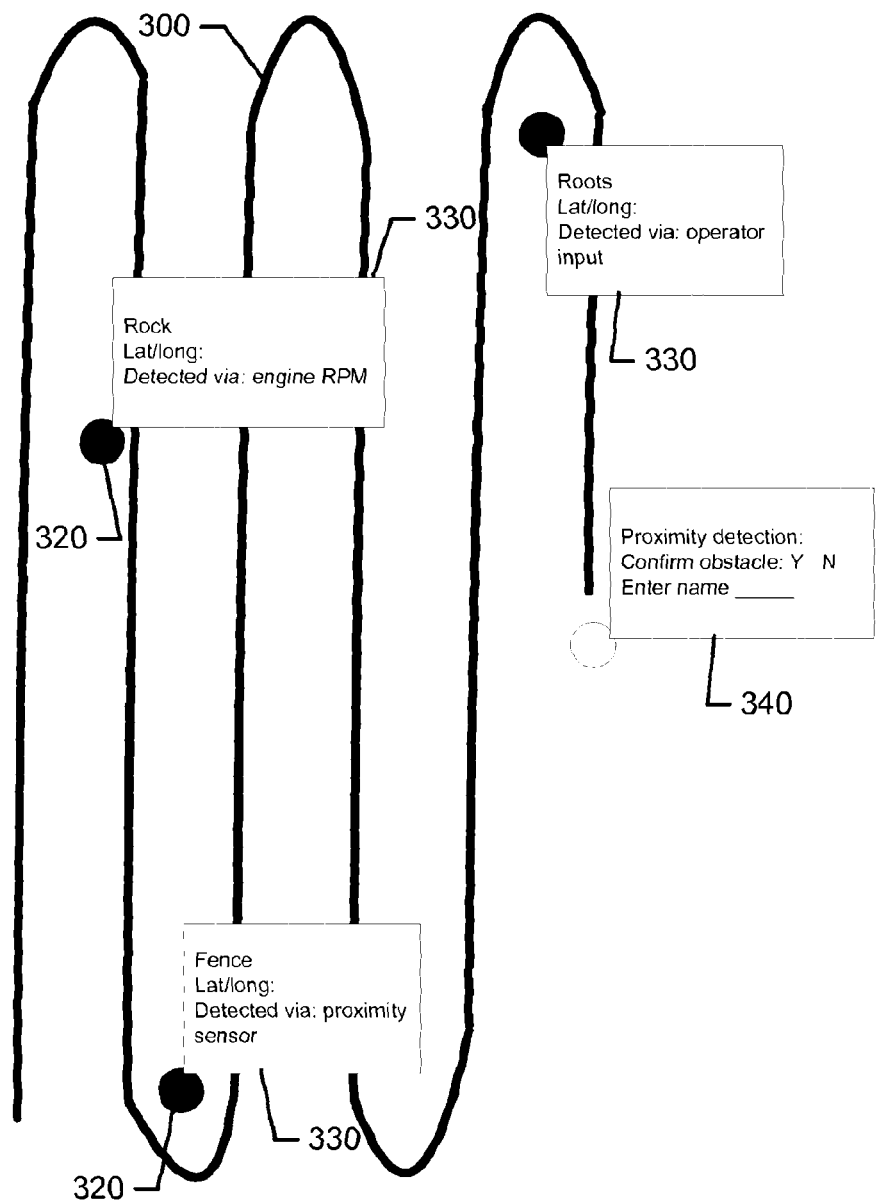
FIG. 3 illustrates a display of a route of a riding yard maintenance vehicle in connection with the presentation of obstacle identifiers according to an example embodiment.

FIG. 3 illustrates an example of a route 300 traced over a particular semi-rectangular parcel with some obstacles positioned at various locations on the parcel. Geographic data used for providing a map view of the parcel may be generated locally or remotely by a mapping application, or may be received from a third party source. Thus, for example, a proprietary mapping application or a publicly available, online mapping application may provide data indicative of the geography of the parcel. Other potential sources may include airborne or satellite images of the parcel, topographical maps, and/or the like. The obstacles may be buildings, rocks, trees, or any other structures around which the riding yard maintenance vehicle 10 must navigate to work the parcel and provide coverage of the parcel (e.g., for lawn mowing). As shown in FIG. 3, the obstacles may each have a generic obstacle marker 320 associated therewith. However, an obstacle annotation 330 may be provided in connection with one or more of the obstacle markers 320 in order to provide more detailed information about the corresponding obstacle. The obstacle annotation 330 may be continuously displayed, or may be displayable responsive to selection by the operator of the obstacle marker 320 or a menu item for causing display of obstacle annotations.

In the example of FIG. 3, obstacle markers 320 and corresponding obstacle annotations 330 may be provided to indicate previously recorded obstacles. The obstacle annotation 330 may, in some embodiments, name the obstacle and provide detailed information regarding the obstacle (e.g., location, triggering mechanism, and/or the like). The operator may be enabled to view (e.g., on display 100) the route 300 (which may be a current or previous route) or at least a view of the parcel without necessarily including an overlaid view of the route 300 in order to see the obstacle markers 320 corresponding to the obstacles that are to be avoided on the parcel (or route 300). Although the obstacle markers 320 and/or obstacle annotations 330 may be continuously displayed, in some cases, the obstacle annotations 330, the obstacle markers 320, and/or some other visible or audible indication or warning may be provided to alert the operator as an obstacle is being approached. Thus, for example, the indication or warning may be provided when the riding yard maintenance vehicle 10 passes within a predefined distance of any obstacle marker 320. The indication or warning may include boldly displayed or flashing visual indicia (e.g., lights, text, graphics and/or the like), some form of audible warning (e.g., voice, buzzing, beeping, or other sounds), tactile feedback, (e.g., seat vibration, handle vibration, etc.) and/or combinations thereof.

Meanwhile, if a potential obstacle is encountered (e.g., passively or responsive to manual operator input) during running of the route 300 or while otherwise operating on the parcel, an obstacle confirmation window 340 may be provided to the operator (e.g., on the display 100). The operator may then confirm whether the potential obstacle is an obstacle to be marked and, in some cases, may also provide information or characteristics about the obstacle to annotate the obstacle. As yet another alternative, the operator may manually initiate presentation of the obstacle confirmation window 340 so that the operator is enabled to enter information regarding creating an obstacle marker 320 whenever the operator feels it is appropriate to do so.

Figure 4:
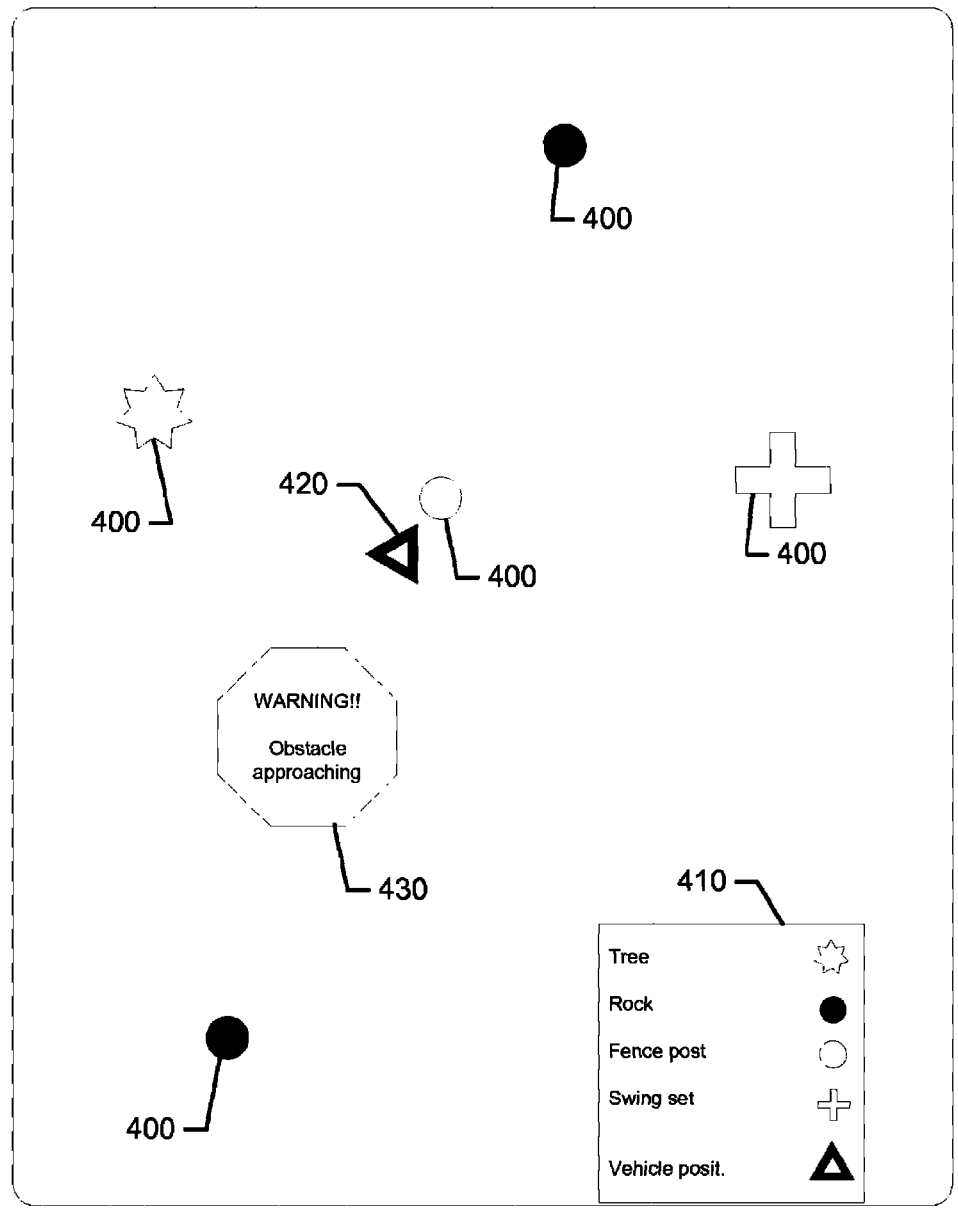
FIG. 4 illustrates a display of a obstacle identifiers and a warning issued during operation of a riding yard maintenance vehicle according to an example embodiment.

FIG. 4 illustrates an example of a parcel without a route displayed thereon, but having obstacle markers 400 displayed thereon. In FIG. 4 also, the parcel may be graphically displayed based on locally or remotely generated data, or based on third party data received in connection with the parcel. Moreover, in some cases, locally or remotely generated data may be merged with third party data to generate a view of the parcel with obstacle markers 400 displayed thereon. The obstacle markers 400 of FIG. 4 are specific to a corresponding type of obstacle. A legend 410 is provided so that each respective icon used as an obstacle marker 400 can be correlated to its respective type of obstacle. However, in some embodiments, the icon itself may include text or graphics to identify the obstacle type and/or other characteristic information regarding the obstacle. AS shown in FIG. 4, a vehicle position indicator 420 may be displayed and, when vehicle position is within a predefined distance from one of the obstacles, a warning 430 may be provided. The warning 430 may be accompanied with audible or tactile feedback. The warning 430 may be presented with distinctive graphics (e.g., flashing), colors (e.g., red, yellow, or other distinctive colors), a distinctive size, or other distinguishing characteristics to enable the operator's attention to be caught. The specific aspects shown in FIGS. 3 and 4 can also be combined in some embodiments.

Figure 5:
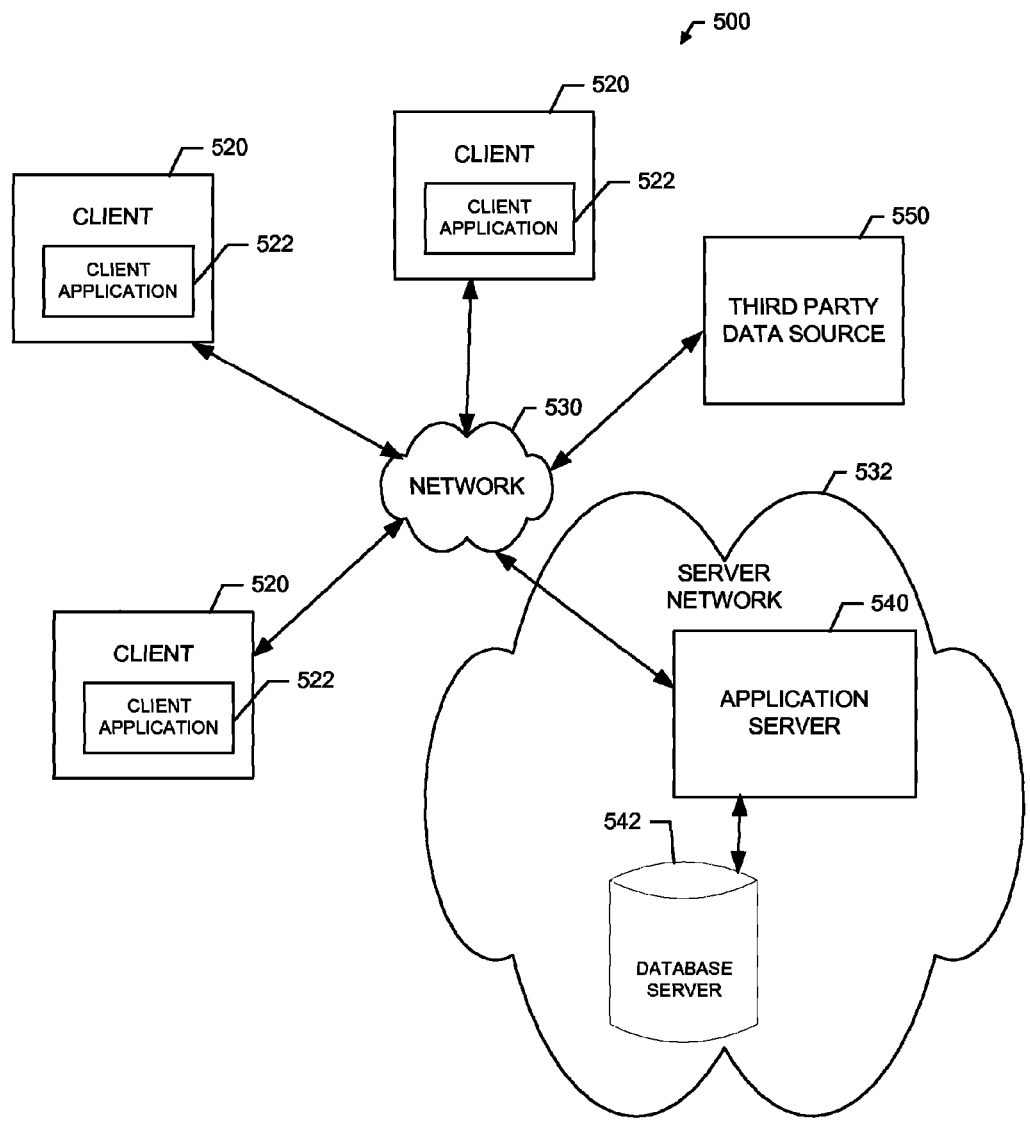
FIG. 5 illustrates a system in which an embodiment of the present invention may be employed according to an example embodiment.

The example embodiments of FIGS. 3 and 4 both illustrate embodiments in which a route or parcel is displayed or displayable, and some form of indication is provided when the operator encounters the recorded location of an obstacle. FIGS. 3 and 4 also illustrate an example via which information on obstacle location can be initially reported and/or recorded. In some embodiments, the route or parcel displayed in FIGS. 3 and 4 may be the same route or parcel over which the riding yard maintenance vehicle recording the data has previously transited. As such, the route or parcel may be a previously stored or generated route or parcel that is locally generated. However, it should be appreciated that some alternative embodiments that operate according to the examples of FIGS. 3 and 4 may operate relative to route or parcel data that has been generated by one or more other vehicles. Thus, for example, one or more vehicles may transit over a route or parcel and provide reporting data to a central facility. The central facility may record obstacle information associated with the corresponding route or parcel and the recorded obstacle information for the respective route or parcel may thereafter be accessed by another riding yard maintenance vehicle for notifying an operator of such vehicle when the operator is proximate to obstacles. FIG. 5 illustrates an example network structure via which such an example embodiment may be practiced.

In this regard, FIG. 5 illustrates a system in which an embodiment of the present invention may be employed. As shown in FIG. 5, a system 500 according to an example embodiment may include one or more clients 520 that may, in some cases, be associated with different corresponding riding yard maintenance vehicles or other remote nodes. For example, among the clients 520, one client may be associated with the riding yard maintenance vehicle 10 and a second client may be associated with a smart phone or other mobile communication device, while a third client may be associated with a computer (e.g., of the operator of the riding yard maintenance vehicle 10 or of a fleet manager of the fleet to which the riding yard maintenance vehicle 10 belongs). The nodes (and the corresponding clients) may be associated with the same individual or organization or the nodes could be associated with different individuals or organizations. As such, in some cases, multiple clients may be associated with the same or different organizations. Furthermore, although different types of possible hosts for the clients 520 are mentioned above, the hosts need not necessarily be different. As such, each one of the clients 520 may be, for example, a computer (e.g., a personal computer, laptop computer, network access terminal, or the like) or may be another form of computing device (e.g., a personal digital assistant (PDA), cellular phone, smart phone, or the like) capable of communication with a network 530. As such, the clients 520 may be fixed at or integrated into riding yard maintenance vehicles, may be removable or transferable accessories or components associated with riding yard maintenance vehicles, or may be separate devices (e.g., a smart phone) capable of running applications useable in connection with operation of riding yard maintenance vehicles.

In some cases, each one of the clients 520 may include (or otherwise have access to) memory for storing instructions or applications for the performance of various functions and a corresponding processor for executing stored instructions or applications. Each one of the clients 520 may also include software and/or corresponding hardware for enabling the performance of the respective functions of the clients as described herein in relation to recording (or providing information for remote recording) of information indicative of obstacle location and/or providing notifications regarding entry into proximity of a previously recorded obstacle location. In an example embodiment, one or more of the clients 520 may include a client application 522 configured to operate in accordance with an example embodiment of the present invention. In this regard, for example, the client application 522 may include software for enabling a respective one of the clients 520 to communicate with the network 530 for requesting and/or receiving obstacle location in the context of a route or parcel in the form of a deliverable component (e.g., as downloadable software to configure the client, or as a transferable memory device including instructions to configure the client). As such, for example, the client application 522 may include corresponding executable instructions for configuring the client 520 to provide corresponding functionalities as described in greater detail herein.

The network 530 may be a data network, such as a local area network (LAN), a metropolitan area network (MAN), a wide area network (WAN) (e.g., the Internet), and/or the like, which may couple the clients 520 to devices such as processing elements (e.g., personal computers, server computers or the like) or databases. Communication between the network 530, the clients 520 and the devices or databases (e.g., servers) to which the clients 520 are coupled may be accomplished by either wireline or wireless communication mechanisms and corresponding protocols.

In an example embodiment, one of the devices to which the clients 520 may be coupled via the network 530 may include one or more application servers (e.g., application server 540), and/or a database server 542, which together may form respective elements of a server network 532. Although the application server 540 and the database server 542 are each referred to as "servers," this does not necessarily imply that they are embodied on separate servers or devices. As such, for example, a single server or device may include both entities and the database server 542 could merely be represented by a database or group of databases physically located on the same server or device as the application server 540. The application server 540 and the database server 542 may each include hardware and/or software for configuring the application server 540 and the database server 542, respectively, to perform various functions. As such, for example, the application server 540 may include processing logic and memory enabling the application server 540 to access and/or execute stored computer readable instructions for performing various functions. In an example embodiment, one function that may be provided by the application server 540 may be the identification of, the recording of and/or receiving of notice of obstacle location in the context of a route or parcel. Alternatively or additionally, the function may include providing an alert responsive to an indication that the operator of a vehicle is within proximity of an obstacle having a recorded location.

In an example embodiment, the application server 540 may include or have access to memory (e.g., internal memory or the database server 542) for storing instructions or applications for the performance of various functions and a corresponding processor for executing stored instructions or applications. For example, the memory may store an instance of the position module 150 configured to operate in accordance with an example embodiment of the present invention. In this regard, for example, the position module 150 may be embodied at the application server 540 and may include software for enabling the application server 540 to communicate with the network 530 and/or the clients 520 for the provision and/or receipt of information associated with obstacle location recording and notifications as described herein.

In some embodiments, a third party data source 550 may be accessible via the network 530 in order to provide third party geographic data to the clients 520 and/or the application server 540 for merging with locally or remotely generated data, or for providing data for generation of map views on which obstacle locations may be provided. As indicated above, the third party geographic data may include maps, images, or other representations of parcels, lots or other geographic regions for which obstacle location identification may be desirable.

As such, the environment of FIG. 5 illustrates an example in which provision of recorded obstacle locations to an onsite device (e.g., the riding yard maintenance vehicle 10 or a mobile phone or device of the operator of the riding yard maintenance vehicle 10) may be accomplished by a remote entity (e.g., the application server 540). As such, the onsite device may be enabled to generate warnings regarding proximity to recorded obstacle locations even if the onsite device did not necessarily record the data itself. Moreover, in some embodiments, provision of location information for obstacles (e.g., obstacle identifiers) may be provided from the onsite device to the remote entity for recording and later provision either to the onsite device or another device that ends up at the same site in the future.

Recordation of location information regarding obstacles may be performed passively or actively such that automatic, manual or combinations of automatic and manual triggers may be used to cause the recordation of a particular location in association with an obstacle. In one embodiment, the triggering may be associated with passively monitored events (e.g., echo location of a proximity sensor or changes measured by an RPM or blade torque sensor or by sound monitoring). However, in other embodiments the triggering may be initiated by the operator. The user may interact with a display (e.g., locally at the riding yard maintenance vehicle or remotely at a computer, mobile communication device, or the like) to manually trigger identification of an obstacle location (in real time or based on a post hoc interpretation of data). Obstacle locations may be annotated, edited or otherwise manipulated by the operator in some cases.

In other example embodiments, the operator may simply press a button at the riding yard maintenance vehicle 10 (e.g., a button on or near the information panel 14) to trigger recordation of obstacle location information responsive to generation of an obstacle identifier. The obstacle location information may be stored in connection with vehicle location for future reference by the same or other vehicles. In this regard, for example, the vehicle recording information may record and reuse such information locally, or may record such information and transfer the information for storage and/or analysis at a central or remote location. The same or other vehicles may then utilize the stored information at a later time. In some embodiments, an operational control function or an alert (visual, audible, tactile, etc.) may be triggered when a vehicle enters within a predefined distance of a recorded obstacle location. The alert may be provided on the display 100 of some riding yard maintenance vehicles. However, in other cases, the alert may be provided by a simple alarm panel or single alarm light that may be disposed, for example, on or proximate to the information panel 14. The alert may be used by the operator to avoid the obstacle, or to lift the cutting deck, stop rotation of the cutting blade, or take other actions to prevent damage from or impact with the obstacle. Moreover, in some cases, an operational control function such as automatic shutdown of the power take-off (PTO) may be initiated when the alert is received in order to prevent possible damage or impact. The form of alert provided may, in some embodiments, be selected by the operator.

Generally speaking, obstacle location information may be generated at a vehicle and stored locally or transferred to a remote device. Locally stored or uploaded information may then be used by the same or other vehicles to utilize previously recorded obstacle location information to generate alerts based on obstacle proximity. The transfer of obstacle location information may be accomplished wirelessly or via removable memory devices.

Although external mapping services may provide relatively easily accessible map data that may show 2D or even 3D views of a parcel to be worked, it should also be appreciated that the positioning module 150 may map parcels itself in some embodiments using GPS or by collection of waypoints or positions relative to one another, or one or more fixed reference points.

Embodiments of the present invention may therefore be practiced using an apparatus such as the one depicted in FIG. 2. However, other embodiments may be practiced in connection with a computer program product for performing embodiments of the present invention. As such, for example, each block or step of the flowchart of FIGS. 6 and 7, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 214) and executed by processing circuitry (e.g., processor 212).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIGS. 6 and 7. Moreover, other methods derived from the descriptions provided herein may also be performed responsive to execution of steps associated with such methods by a computer programmed to be transformed into a machine specifically configured to perform such methods.

Figure 6:
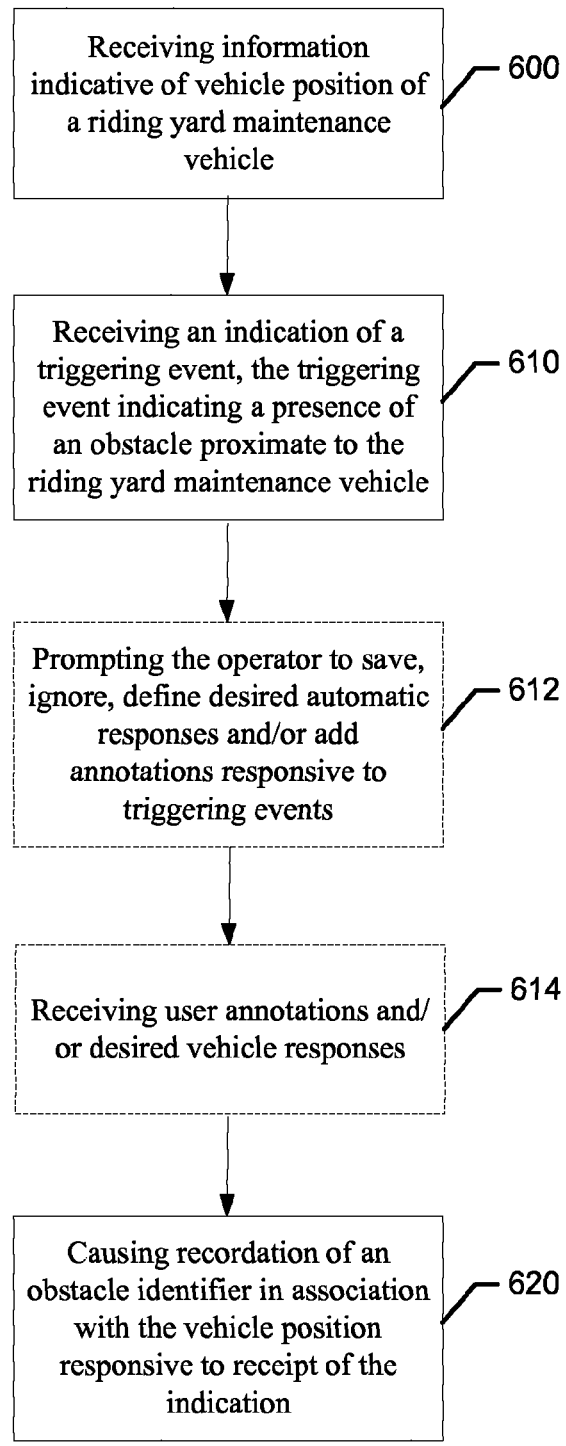
FIG. 6 illustrates a block diagram of a method according to an example embodiment.

In an example embodiment, a method for recording obstacle identifiers in association with position information of a riding yard maintenance vehicle, as shown in FIG. 6, may include receiving information indicative of vehicle position of a riding yard maintenance vehicle at operation 600, receiving an indication of a triggering event that indicates a presence of an obstacle proximate to the riding yard maintenance vehicle at operation 610, and causing (e.g., via processing circuitry) recordation of an obstacle identifier in association with the vehicle position responsive to receipt of the indication at operation 620.

In some embodiments, certain ones of the operations above may be modified or further amplified as described below. Moreover, in some embodiments additional optional operations may also be included (some examples of which is shown in dashed lines in FIG. 6). It should be appreciated that each of the modifications, optional additions or amplifications below may be included with the operations above either alone or in combination with any others among the features described herein. In an example embodiment, the method may further include prompting the operator to save, ignore, define desired automatic responses and/or add annotations responsive to triggering events at operation 612. The triggering event may be initiated based on active (e.g., via pressing a button or marking a position on a display) or passive activity (e.g., via RPM or torque changes, or proximity sensor operation). In an example embodiment, the method may further include receiving user annotations and/or desired vehicle responses (e.g., that may be provided in connection with operation 612) at operation 614. In some embodiment, receiving the information and receiving the indication may each occur locally at the riding yard maintenance vehicle, remotely from the riding yard maintenance vehicle, or at a mobile communication device of an operator of the riding yard maintenance vehicle. In an example embodiment, causing recordation of the obstacle identifier may include storing the obstacle identifier in a database locally at the riding yard maintenance vehicle or storing the obstacle identifier in a database that is remotely located from the riding yard maintenance vehicle. The method may further include determining proximity of the riding yard maintenance vehicle to one or more stored obstacle identifiers and generating an alert to the operator responsive to the riding yard maintenance vehicle being within a predefined distance from one of the one or more stored obstacle identifiers.

In an example embodiment, an apparatus for performing the method of FIG. 6 above may comprise a processor (e.g., the processor 212) configured to perform some or each of the operations (600-620) described above. The processor 212 may, for example, be configured to perform the operations (600-620) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 600-620 may comprise, for example, the positioning module 150. Additionally or alternatively, at least by virtue of the fact that the processor 212 may be configured to control or even be embodied as the positioning module 150, the processor 212 and/or a device or circuitry for executing instructions or executing an algorithm for processing information as described above may also form example means for performing operations 600-620.

Figure 7:
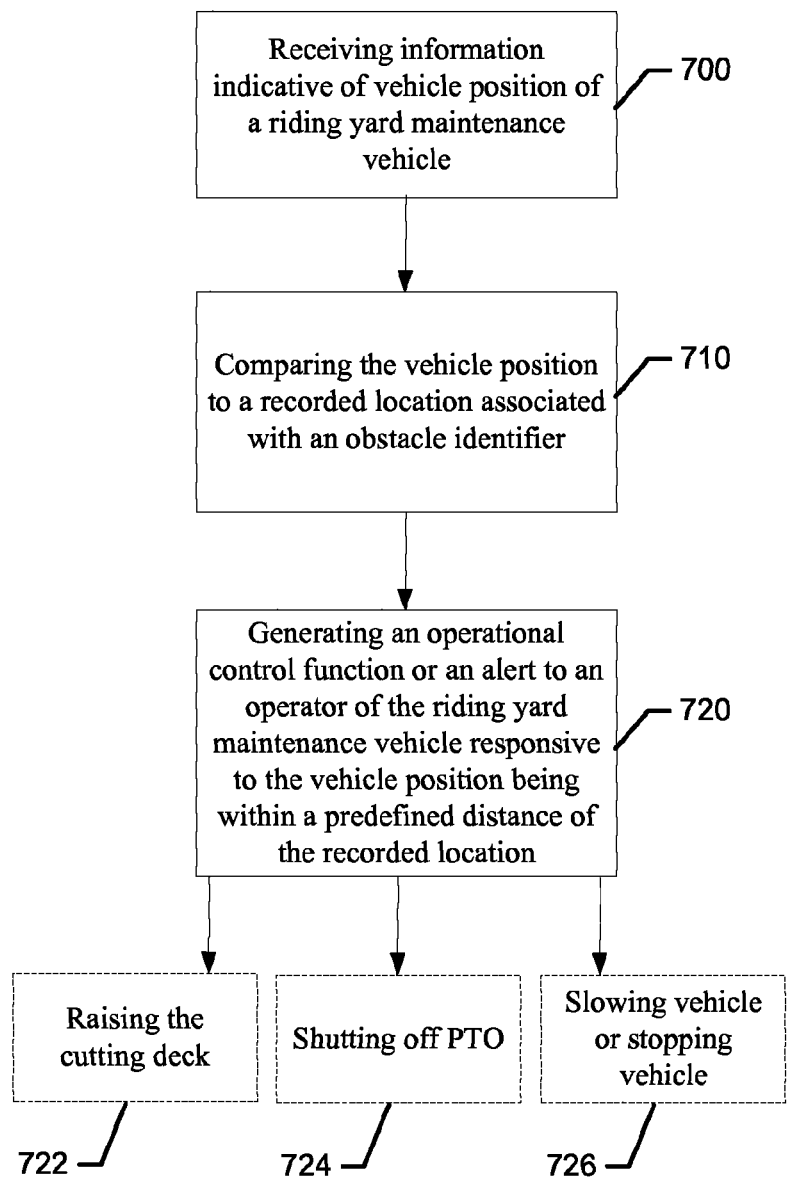
FIG. 7 illustrates a block diagram of a method according to another example embodiment.

In another example embodiment, a method for providing an alert regarding proximity to a previously recorded obstacle position, as shown in FIG. 7, may include receiving information indicative of vehicle position of a riding yard maintenance vehicle at operation 700, comparing (e.g., via processing circuitry) the vehicle position to a recorded location associated with an obstacle identifier at operation 710, and generating an alert to an operator of the riding yard maintenance vehicle responsive to the vehicle position being within a predefined distance of the recorded location at operation 720.

In some embodiments, certain ones of the operations above may be modified or further amplified as described below. Moreover, in some embodiments additional optional operations may also be included (some examples of which is shown in dashed lines in FIG. 7). It should be appreciated that each of the modifications, optional additions or amplifications below may be included with the operations above either alone or in combination with any others among the features described herein. In an example embodiment, the method may further include some specific examples of automatic control functions illustrated by operations 722, 724 and 726. In this regard, for example, the method may further include raising the cutting deck at operation 722, shutting off the PTO at operation 724, and/or slowing down or stopping the vehicle at operation 726. The automatic control functions may be defined, for example, when the corresponding obstacle location is stored. Each of the automatic control functions may be enabled to be overridden in some cases. Thus, operations 722, 724 and 726 may be initiated only if they are not overridden. In some embodiments, the recorded location may be a location previously recorded at the riding yard maintenance vehicle and stored locally at the riding yard maintenance vehicle or may be a location stored remotely from the riding yard maintenance vehicle and provided to the riding yard maintenance vehicle. In an example embodiment, operations 700-726 (regardless of whether the recorded location is stored locally or remotely) may be performed at the riding yard maintenance vehicle or at a mobile communication device (e.g., via a smart phone application) of the operator of the riding yard maintenance vehicle. The alert generated may be audible, visual, and/or tactile.

In an example embodiment, an apparatus for performing the method of FIG. 7 above may comprise a processor (e.g., the processor 212) configured to perform some or each of the operations (700-726) described above. The processor 212 may, for example, be configured to perform the operations (700-726) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 700-726 may comprise, for example, the positioning module 150. Additionally or alternatively, at least by virtue of the fact that the processor 212 may be configured to control or even be embodied as the positioning module 150, the processor 212 and/or a device or circuitry for executing instructions or executing an algorithm for processing information as described above may also form example means for performing operations 700-726.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein.

Although specific terms are employed herein, they are used in a generic and descriptive sense only and not for purposes of limitation.

That which is claimed:

1. A method comprising:
receiving information indicative of a first vehicle position of a riding yard maintenance vehicle;
receiving an indication of a triggering event, the triggering event indicating a presence of an obstacle proximate to the riding yard maintenance vehicle when the riding yard maintenance vehicle is in the first vehicle position, wherein the triggering event comprises a passive event, the passive event comprising an engine operation parameter exceeding a threshold;
causing, via processing circuitry, recordation of an obstacle identifier in association with the first vehicle position responsive to receipt of the indication; and generating an operational control function responsive to a second vehicle position being within a predefined distance of the recorded obstacle identifier,
   wherein generating the operational control function comprises: stopping rotation of a cutting blade of the riding yard maintenance vehicle, stopping operation of a power-take-off (PTO) of the riding yard maintenance vehicle, or adjusting a height of the cutting blade of the riding yard maintenance vehicle.

2. The method of claim 1, wherein the engine operation parameter is a change in engine revolutions per minute (RPM); or
   a change in engine torque.

3. The method of claim 1, wherein the triggering event further comprises an active event, the active event comprising:
   operator selection of a button to cause generation of the obstacle identifier associated with the first vehicle position; or
   operator placement of an obstacle marker on a graphical display in association with a route or parcel on which the riding yard maintenance vehicle is operating.

4. The method of claim 1, wherein receiving the information and receiving the indication each occur locally at the riding yard maintenance vehicle.

5. The method of claim 1, wherein receiving the information and receiving the indication each occur remotely from the riding yard maintenance vehicle.

6. The method of claim 1, wherein receiving the information and receiving the indication each occur at a mobile communication device of an operator of the riding yard maintenance vehicle.

7. The method of claim 4, wherein causing recordation of the obstacle identifier comprises storing the obstacle identifier in a database locally at the riding yard maintenance vehicle.

8. The method of claim 4, wherein causing recordation of the obstacle identifier comprises storing the obstacle identifier in a database remote from the riding yard maintenance vehicle.

9. The method of claim 1, further comprising prompting an operator to save, define desired automatic responses, or add annotations responsive to the triggering event.

10. The method of claim 1, wherein the triggering event further comprises an active event, the active event comprising receiving a user annotation or desired vehicle response from an operator.

11. The method of claim 1 further comprising: generating an alert responsive to the second vehicle position being within the predefined distance of the recorded obstacle identifier.

12. The method of claim 1 further comprising: prompting an operator of the riding yard maintenance vehicle to confirm whether the triggering event should be marked as the obstacle identifier.

13. A riding yard maintenance vehicle comprising:
   ground contacting wheels;
   an engine operably coupled to the ground contacting wheels;
   a steering assembly operably coupled to the ground contacting wheels to direct movement of the riding yard maintenance vehicle based on operator steering inputs; and
   a positioning module configured to enable storage of vehicle position information, the positioning module comprising processing circuitry configured to:
      receive information indicative of a first vehicle position of the riding yard maintenance vehicle;
      receive an indication of a triggering event, the triggering event indicating a presence of an obstacle proximate to the riding yard maintenance vehicle when the riding yard maintenance vehicle is in the first vehicle position, wherein the triggering event comprises a passive event, the passive event comprising a change in engine revolutions per minute (RPM) above a threshold amount, a change in engine torque above a threshold amount, or a change in cutting deck sound;
      cause recordation of an obstacle identifier in association with the first vehicle position responsive to receipt of the indication; and
      generate an operational control function responsive to a second vehicle position being within a predefined distance of the recorded obstacle identifier,
      wherein generating the operational control function comprises: stopping rotation of a cutting blade of the riding yard maintenance vehicle, stopping operation of a power-take-off (PTO) of the riding yard maintenance vehicle, or adjusting the height of a cutting blade of the riding yard maintenance vehicle.

14. The riding yard maintenance vehicle of claim 13, wherein the triggering event further comprises an active event comprising:
   operator selection of a button to cause generation of the obstacle identifier associated with the first vehicle position; or
   operator placement of an obstacle marker on a graphical display in association with a route or parcel on which the riding yard maintenance vehicle is operating.

15. The riding yard maintenance vehicle of claim 13, wherein the processing circuitry is further configured to generate an alert responsive to the second vehicle position being within the predefined distance of the recorded obstacle identifier.

16. The riding yard maintenance vehicle of claim 15, wherein the processing circuitry is further configured to prompt an operator of the riding yard maintenance vehicle to confirm whether the triggering event should be marked as the obstacle identifier.

17. A method comprising:
   receiving information indicative of a vehicle position of a riding yard maintenance vehicle;
   comparing, via processing circuitry, the vehicle position to a recorded location associated with an obstacle identifier, the recorded location being associated with a previous vehicle position of the riding yard maintenance vehicle and the recorded location having been stored in response to a triggering event comprising a passive event, the passive event comprising an engine operation parameter exceeding a threshold; and
   generating, based on the comparing, an operational control function responsive to the vehicle position being within a predefined distance of the recorded location,
   wherein generating the operational control function comprises: stopping rotation of a cutting blade of the riding yard maintenance vehicle, stopping operation of a power-take-off (PTO) of the riding yard maintenance vehicle, or adjusting a height of the cutting blade of the riding yard maintenance vehicle.

18. The method of claim 17, wherein the recorded location is stored locally at the riding yard maintenance vehicle, or at a location stored remotely from the riding yard maintenance vehicle and provided to the riding yard maintenance vehicle, and wherein receiving the information, comparing the vehicle position to the recorded location, and generating the alert each occur at the riding yard maintenance vehicle, or at a mobile communication device of an operator of the riding yard maintenance vehicle.

19. The method of claim 17, further comprising generating an alert responsive to the vehicle position being within a predefined distance of the recorded location.

\* \* \* \* \*